Dec. 27, 1927.
C. CLAUS
1,654,509
ANTIFRICTION BEARING AND METHOD OF FORMING THE SAME
Filed Aug. 30, 1924   2 Sheets-Sheet 1
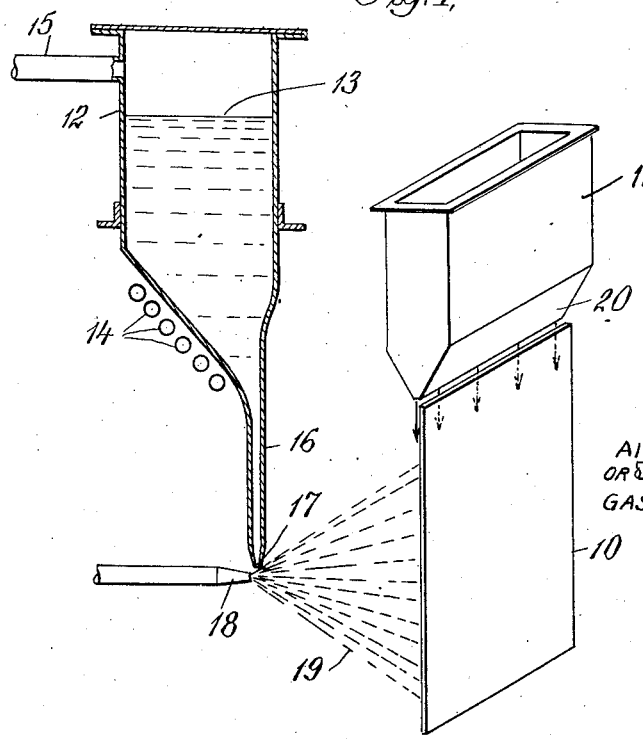
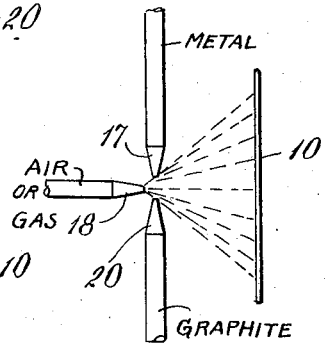
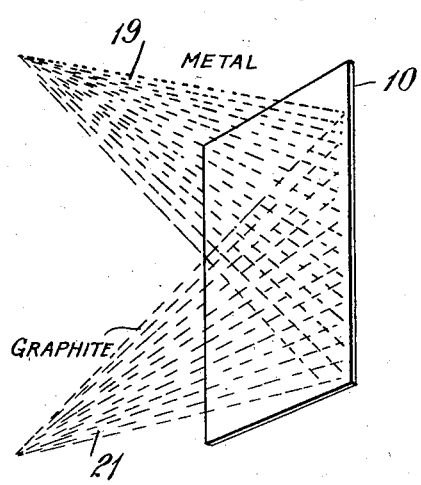
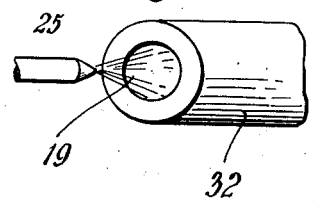
INVENTOR
Carl Claus
BY Willis Fowler
ATTORNEY Dec. 27, 1927.
1,654,509
C. CLAUS
ANTIFRICTION BEARING AND METHOD OF FORMING THE SAME
Filed Aug. 30, 1924
2 Sheets-Sheet 2
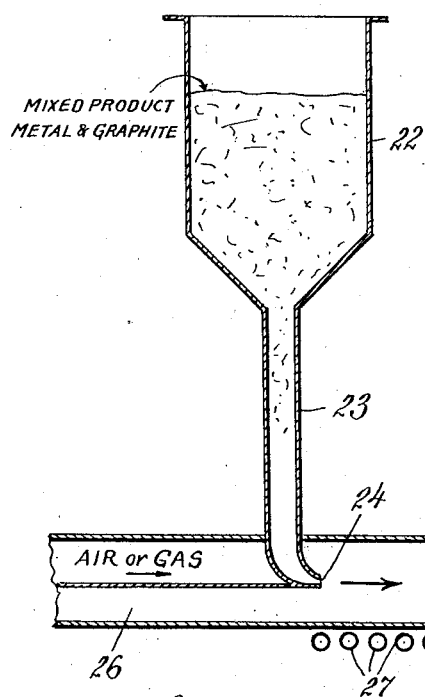
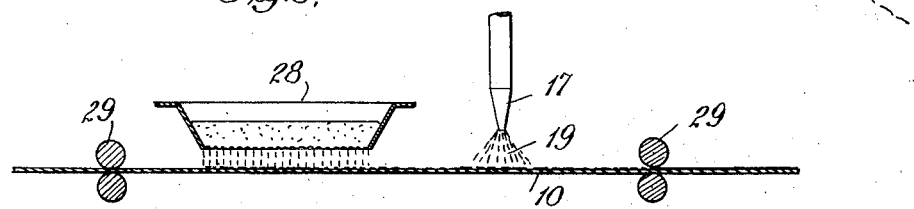
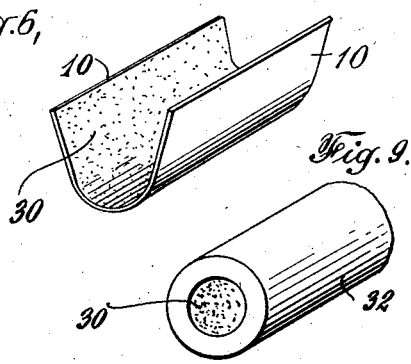
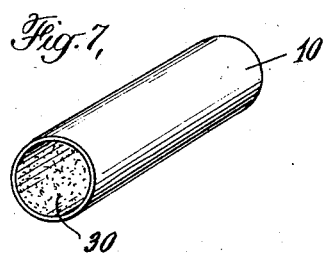

Patented Dec. 27, 1927.

1,654,509

UNITED STATES PATENT OFFICE.

CARL CLAUS, OF PLAINFIELD, NEW JERSEY, ASSIGNOR TO BOUND BROOK OIL-LESS BEARING COMPANY, OF BOUNDBROOK, NEW JERSEY, A CORPORATION OF NEW JERSEY.

ANTIFRICTION BEARING AND METHOD OF FORMING THE SAME.

Application filed August 30, 1924. Serial No. 735,119.

This invention relates generally to antifriction bearings and more particularly to an improved method or process for forming a bearing surface containing graphite and to the product obtained in the practice of the method.

A general object of the invention is to provide a bearing structure of the self-lubricating type which can be produced at an economical manufacturing cost and which will function with a high degree of lubricating efficiency.

The invention includes a process for forming a bearing which consists in providing a foundation or base member, having the necessary strength, with a coating or surface comprising graphite held in place by a bond or matrix of suitable metal, which is softened for the purpose through the action of heat and applied by means of a spraying operation.

In producing the lubricating surface thus described, the graphite may be applied in various ways but the application of the metal binder or matrix is believed to be best achieved by spraying particles of metal in a molten or plastic condition directly against the surface of the bearing member. The graphite particles may be applied to the bearing surface in advance of the application of the metal spray or may be delivered in the form of a cross-current into the spray to be thereby sprayed against the surface with the softened metal. Another method of application is to provide a preliminary mixture of powdered metal and graphite and to pass the mixture through a spraying nozzle, heat being applied to soften the metal either by direct application to the burner or in the form of a blow-torch flame issuing from the nozzle and producing the spray.

Other features of the invention will be hereinafter referred to.

In the drawings,

Figure 1 is a diagrammatic view of apparatus for carrying out one embodiment of the invention.

Figure 2 is a diagrammatic view showing a detail of a modified form of the invention.

Figure 3 is a view similar to Figure 2 showing still another embodiment of the invention.

Figure 4 is a view similar to Figure 1 of another embodiment of the invention.

Figure 5 is a diagrammatic view of still another embodiment of the invention.

Figure 6 is a perspective view of a partly formed bushing having a lubricating surface formed in accordance with the invention.

Figure 7 is a perspective view of a completed bushing formed in accordance with the invention.

Figure 8 is a view in perspective showing the application of a lubricating surface to a hollow bushing of a cast or other seamless tube type.

Figure 9 is a view in perspective of a completed bearing treated in the manner shown in Figure 8.

Referring to the drawings for a more detailed description of the invention, in Figure 1 a sheet of metal 10 is in process of being supplied with a lubricating coating or surface containing graphite. Graphite, in flake or powdered form, is contained in a hopper or receptacle 11 and is discharged from a slit in the converging lower end of the hopper to fall in the form of a curtain or sheet adjacent to a surface of the metal sheet 10.

At 12 is shown a receptacle for molten metal 13 which is maintained in a suitable condition of fluidity by means of the burner 14. The molten metal in the container may be kept under pressure through air pressure supplied to the receptacle 12 through the conduit 15. The lower end of the container 12 terminates in a nozzle member 16 through which molten metal is delivered at the nozzle discharge tip 17.

A compressed-air discharge nozzle 18 is so arranged with relation to the molten metal delivery nozzle 16 that the molten metal emerging from the nozzle 17 is caught and thrown in the form of a spray 19 against the surface of the metal sheet 10. The spray of molten or plastic metal particles acts to catch and pin the particles of graphite against the surface of the metal sheet and to thereby provide, when the metal cools and hardens, a metal bond or matrix for the graphite particles.

The coating thus provided may be relatively homogeneous or it may be of a porous nature to provide an absorbing and holding medium for liquid lubricating materials. The degree of porosity may be determined by the manner of operation, by the relative proportion of ingredients, the force of the spray, temperature conditions, and other factors. The metal sheet 10 may be heated before applying the coating thereto and may also be subjected to any desired cleaning process.

In Figure 2 of the drawing is shown a method of applying the coating to the metal sheet 10 in which a delivery nozzle 20 for graphite particles is arranged to discharge into the air stream issuing from the nozzle 18 substantially at the same point at which the molten metal is fed to the air stream. This arrangement provides a spray of commingled graphite and metal particles which are in a molten or plastic condition.

In Figure 3 of the drawing is illustrated a method in which two distinct sprays of metal 19 and of graphite 21 are discharged against the surface of the metal sheet 10.

In Figure 4 of the drawings is illustrated an arrangement wherein mixed powdered metal and graphite are fed from a hopper 22 through a conduit 23 into a centrally disposed discharge nozzle 24 in the nozzle 25. A compressed air supply pipe 26 delivers an air blast stream to the nozzle 25 to produce a spray of the mixed materials fed from the hopper 22. Suitable burners 27 may be used in applying heat to the nozzle 25 to soften the metal particles passing therethrough to produce a necessary degree of plasticity therein to obtain the desired bonding action of the metal on the graphite particles.

Instead of applying heat to the nozzle, as is shown in Figure 4, I may make use of a blowtorch effect, using an oxy-hydrogen or oxyacetylene flame to produce the desired heating and softening of the metal particles in the mixture. With this method of heating, the flame may be given a reducing character by suitably proportioning the constituent gases in order to prevent combustion of the graphite.

Instead of mixing the metal powders as in Figure 4, the powders may be fed to the discharge nozzle 25 from separate receptacles to undergo the mixing process as they emerge from the spray nozzle.

In Figure 5 of the drawing there is shown another method of producing the coating which consists in depositing particles of graphite on a horizontally moving metal sheet 10 from a sieve 28 or the like and in discharging a spray of molten metal 19 from the nozzle 17 to pin the graphite particles in place. The sheet 10 may be caused to travel with relation to the depositing devices by means of the rollers 29. It will be clear that the sheet being coated may be caused to move relatively to the coating apparatus in the arrangements illustrated in the remaining figures of the drawing.

The methods described and illustrated for producing a lubricating coating may be used in connection with bearings of any character and is well adapted for use with cast or solid and heavy bearing structures. Coatings of this type are also particularly useful in circumstances where relatively thin sheet-metal bushings are used. In producing bearings of this type metal in flat sheet form may be coated in the manner described and then subjected to slitting and forming operations one step of which is illustrated in the partly formed bearing in Figure 6. The member may be completely closed to produce the tubular construction shown in Figure 7 in which the coated surface 30 is presented inwardly for bearing engagement with a shaft journaled therein. The abutting edges of the bushings may be dovetailed into each other by a suitable swaging operation which serves also to smooth the surfaces of the bushing, the smoothing operation being carried further, if desired, in a sizing operation that completes the chain of operations and produces a finished structure.

The powdered metals referred to may be in oxidized form, in which case a blow flame of a reducing character may be used in heating the particles to reduce the oxidized metals to metallic form and at the same time prevent combustion of the graphite in obtaining the requisite degree of softness or plasticity of the metal. It will be clear that the metal may also be heated to a degree to produce a molten condition thereof.

In addition to the sheet-metal type of bearing which has been described, in Figure 8 is shown a method of application of the spray 19 to the inner surface of a bushing 32 of any desired wall-thickness and which may have a cylindrical or other formation in cross-section. In this operation the spray nozzle 25 is disposed to direct the spray into the bore of the bushing to thereby coat the inner surface thereof. It will be clear that a similar method may be employed for applying a self-lubricating surface to preformed bearing members of other and various types and sizes.

I contemplate also the building up of a bearing member of sufficient thickness to serve as a bearing in itself and in removing the bearing member thus formed from the support used in the building-up operation.

While the spray metal has been referred to as principally serving as a binding or matrix metal it may also have in itself friction-reducing properties such as are afforded by copper, tin, lead, iron, aluminum, babbitt, or mixtures or alloys of these or other bearing metals. The foundation or base member may be iron or steel, or bronze, copper, or any other metal having the necessary qualities of physical strength and resistance to mechanical strain.

What I claim is:—

1. That method of producing bearing material which consists in providing a suitable base and then forming on the surface thereof by spraying action a layer composed of a softened metal matrix containing a solid lubricating material.

2. That method of producing bearing material which consists in providing a suitable base and then forming on the surface thereof by spraying operation a layer made of a heat-softened metal matrix containing a solid lubricating material.

3. That method of producing a lubricating surface which consists in discharging graphite particles on a supporting surface and spraying plastic metal against said graphite carrying surface producing thereby an antifriction coating of graphite particles and metal.

4. That method of producing a lubricating surface which consists in spraying softened metal against a surface to produce a coating thereon, and in causing particles of solid lubricant to be impinged against the coated surface with sufficient force to embed the material in the coating layer so that said particles of solid lubricant and the metal are together forced against said surface thereby producing thereon a lubricating coating.

5. That method of producing a lubricating surface which consists in spraying plastic metal against a supporting surface, and in discharging graphite particles into the path of the spraying metal so that said graphite particles and plastic metal are together applied to said supporting surface as a coating thereon.

6. That method of producing bearing material which consists in providing a suitable base and then forming on the surface thereof by spraying action an antifriction coating made of molten metal and graphite particles.

7. That method of producing a self-lubricating bearing which consists in providing a suitable base and then forming on the bearing-surface thereof by spraying action a layer composed of heat-softened bearing-metal matrix and graphite particles.

8. That method of producing an antifriction bearing which consists in providing a suitable base consisting of a section of sheet-metal and then forming on the surface thereof by spraying action a layer made of a molten metal matrix containing particles of graphite, and then forming bearing bushings of the coated sheet thus produced.

9. That method of producing an antifriction bearing which consists in providing as a base a sheet of metal and then forming on one surface of said sheet by spraying action a layer made of molten metal containing particles of graphite, then cutting the coated sheet into sections, and then in forming the sections into bearing bushings with the coated surface inside.

In testimony whereof, I have hereunto set my hand.

CARL CLAUS.